United States Patent
Kim et al.

(10) Patent No.: US 11,808,429 B2
(45) Date of Patent: Nov. 7, 2023

(54) ASSSEMBLY OF LAMP AND CAMERA FOR AUTOMOBILE

(71) Applicant: HYUNDAI MOBIS CO., LTD., Seoul (KR)

(72) Inventors: Myeong Je Kim, Yongin-si (KR); Jung Sub Lim, Yongin-si (KR); Han Seong Yu, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/336,232

(22) Filed: Jun. 1, 2021

(65) Prior Publication Data

US 2021/0388963 A1    Dec. 16, 2021

(30) Foreign Application Priority Data

Jun. 11, 2020    (KR) .................. 10-2020-0071090

(51) Int. Cl.
*F21S 41/657*    (2018.01)
*B60R 11/04*    (2006.01)

(52) U.S. Cl.
CPC ............ *F21S 41/657* (2018.01); *B60R 11/04* (2013.01); *B60R 2300/80* (2013.01)

(58) Field of Classification Search
None
See application file for complete search history.

(56) References Cited

U.S. PATENT DOCUMENTS

| 2011/0193960 A1 | 8/2011 | Endo et al. | |
| 2015/0109449 A1* | 4/2015 | Endo | B60Q 1/0023 348/148 |
| 2019/0275923 A1* | 9/2019 | Fushimi | G01S 13/931 |

FOREIGN PATENT DOCUMENTS

| JP | 2001-088610 | 4/2001 | |
| JP | 2011-162080 | 8/2011 | |
| JP | 2013-164913 | 8/2013 | |
| JP | 2018-101476 | 6/2018 | |
| JP | 2019-194940 | 11/2019 | |
| WO | WO-2019212032 A1 * | 11/2019 | ........... B60Q 1/0023 |

OTHER PUBLICATIONS

Chinese Office Action dated Jul. 15, 2023 issued in CN 2021106509782.
English Language Abstract of JP 2001-088610 published Apr. 3, 2001.
English Language Abstract of JP 2011-162080 published Aug. 25, 2011.
(Continued)

*Primary Examiner* — Elmito Breval
(74) *Attorney, Agent, or Firm* — DLA PIPER LLP (US)

(57) ABSTRACT

An assembly of a lamp and a camera for an automobile, the assembly including: a light source configured to emit light forward; a camera provided on one side of the light source and configured to capture an external image; a lens unit provided in front of the light source and the camera; and a light blocking member which is provided to surround an outer side of a camera lens provided in the camera and which is configured to block at least a portion of light emitted from the light source. The light blocking member is provided in close contact with the lens unit.

18 Claims, 8 Drawing Sheets

(56) References Cited

OTHER PUBLICATIONS

English Language Abstract of JP 2013-164913 published Aug. 22, 2013.
English Language Abstract of JP 2018-101476 published Jun. 28, 2018.
English Language Abstract of JP 2019-194940 published Nov. 7, 2019.

* cited by examiner

ASSSEMBLY OF LAMP AND CAMERA FOR AUTOMOBILE

CROSS-REFERENCE TO RELATED APPLICATION(S)

This application claims priority from and the benefit of Korean Patent Application No. 10-2020-0071090, filed on Jun. 11, 2020, which is hereby incorporated by reference for all purposes as if set forth herein.

TECHNICAL FIELD

Exemplary embodiments relate to an assembly of a lamp and a camera for an automobile.

BACKGROUND

Recently, in order to assist or replace driving of a driver, research on devices mounted to an automobile has been actively performed. As one example of the devices, a lamp for an automobile is equipped with not only a light source and a lens but also a camera for capturing images of a region in front or rear of the automobile.

However, according to the related art, when the camera is mounted to the lamp for an automobile as described above, a portion of light coming from the light source mounted to the lamp for an automobile enters the camera, which causes significant deterioration in qualities of the images captured by the camera. For example, when the camera is mounted to the lamp for an automobile, a portion of the light emitted from the light source mounted to the lamp for an automobile is reflected from the lens of the lamp for an automobile and then enters the camera. Accordingly, the image captured by the camera is distorted due to the light entering.

SUMMARY

Exemplary embodiments of the present disclosure is to prevent deterioration in quality of an image captured by a camera due to light emitted from a light source in a lamp for an automobile to which the camera is mounted.

A first exemplary embodiment of the present disclosure provides an assembly of a lamp and a camera for an automobile, the assembly including: a light source configured to emit light forward; a camera provided on one side of the light source and configured to capture an external image; a lens unit provided in front of the light source and the camera; and a light blocking member which is provided to surround an outer side of a camera lens provided in the camera and which is configured to block at least a portion of light emitted from the light source, wherein the light blocking member is provided in close contact with the lens unit.

The light blocking member may be provided in the outside of a space within a view angle of the camera.

At least a portion of the light blocking member may be provided in a space within a view angle of the camera.

The lens unit may include a partition wall which is provided on an inner surface of the lens unit and has a shape protruding toward the camera, and the light blocking member may be provided in close contact with the partition wall.

The partition wall may be provided in the outside of a space within a view angle of the camera.

At least a portion of the partition wall may be provided in a space within a view angle of the camera.

The assembly may further include a housing having an inner space in which the light source, the camera, and the light blocking member are accommodated, wherein the lens unit is provided in a region in front of the housing, and hook coupling is established between a circumferential area of the lens unit and a circumferential area of the housing.

A housing protrusion protruding toward the lens unit may be provided in the circumferential area in the front of the housing, and a lens protrusion protruding toward the housing may be provided in the circumferential area of the lens unit, wherein the hook coupling is established in a region in which the housing protrusion and the lens protrusion are in contact with each other.

The lens unit may include: a lens body forming a body of the lens unit; and an edge forming the circumferential area of the lens unit, wherein the lens protrusion is provided on the edge.

The edge may be made of a material different from that of the lens body.

The lens protrusion may be provided surrounding an outer circumference of the housing protrusion.

A recessed section may be provided in a portion of an outer surface of the housing protrusion, and the hook coupling may be established in the recessed section.

A bent section having a shape bent toward the housing protrusion may be provided at an end of the lens protrusion, and the hook coupling may be established by inserting the bent section into the recessed section.

The light blocking member may be provided surrounding the entire outer circumference of the camera lens.

The partition wall may be provided surrounding the entire outer circumference of the camera lens.

The edge and the housing protrusion may be made of the same material.

The light blocking member may be made of a visible light impermeable material.

When viewed from a region in front of the lens unit, the partition wall may be provided within the light blocking member.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, an assembly of a lamp and a camera for an automobile according to the present disclosure will be described with reference to the drawings.

Assembly of Lamp and Camera for Automobile

Figure 1:
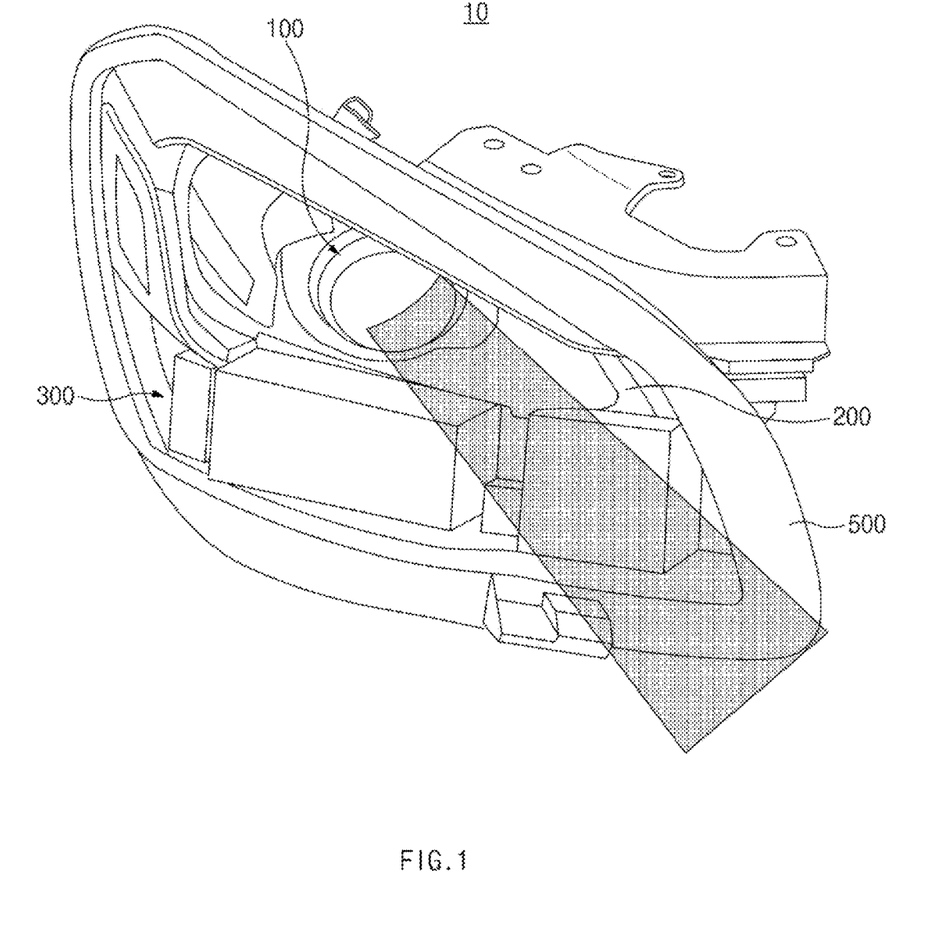
FIG. 1 is a perspective view illustrating an assembly of a lamp and a camera for an automobile according to the present disclosure.
Figure 2:
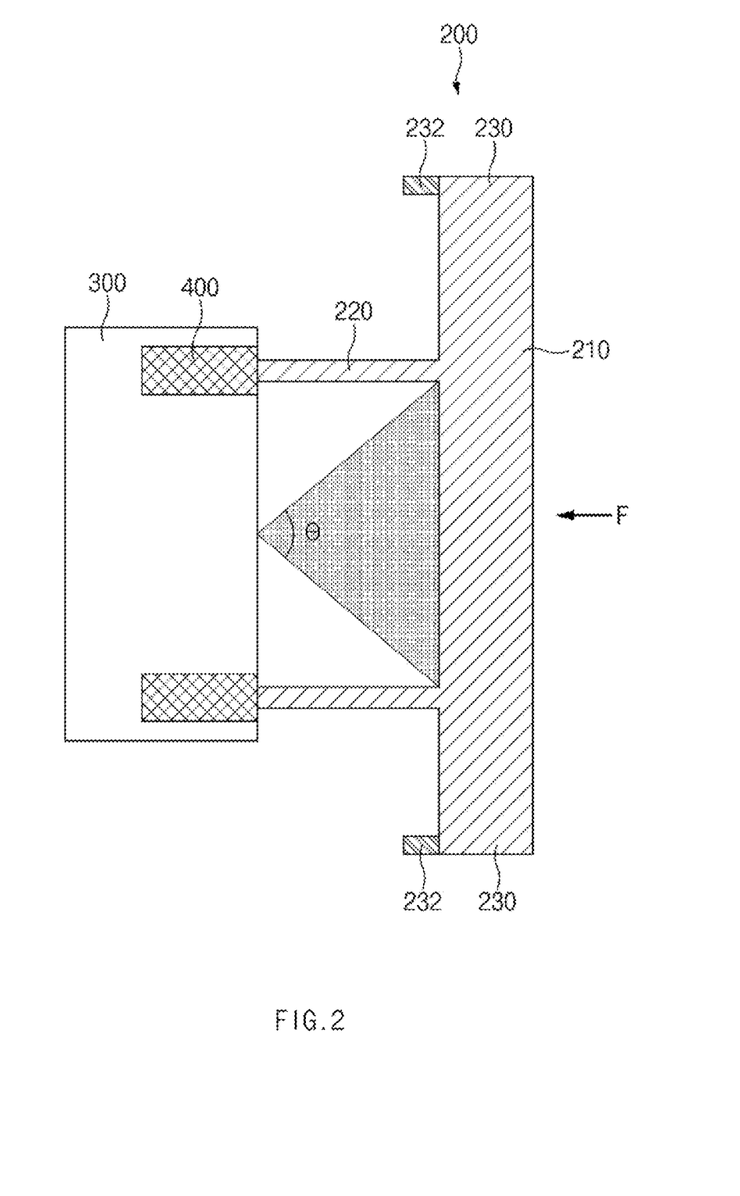
FIG. 2 is a side cross-sectional view schematically illustrating a coupling structure of a lens unit, a camera, and a light blocking member in an assembly of a lamp and a camera for an automobile according to an exemplary embodiment of the present disclosure.
Figure 3:
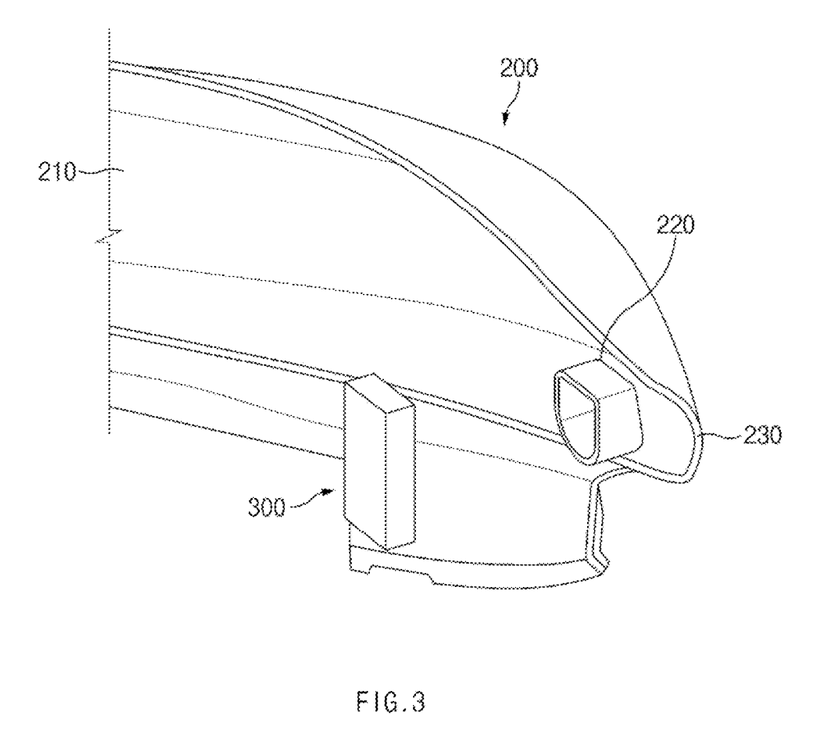
FIG. 3 is an exploded perspective view of the assembly of a lamp and a camera for an automobile according to an exemplary embodiment of the present disclosure.
Figure 4:
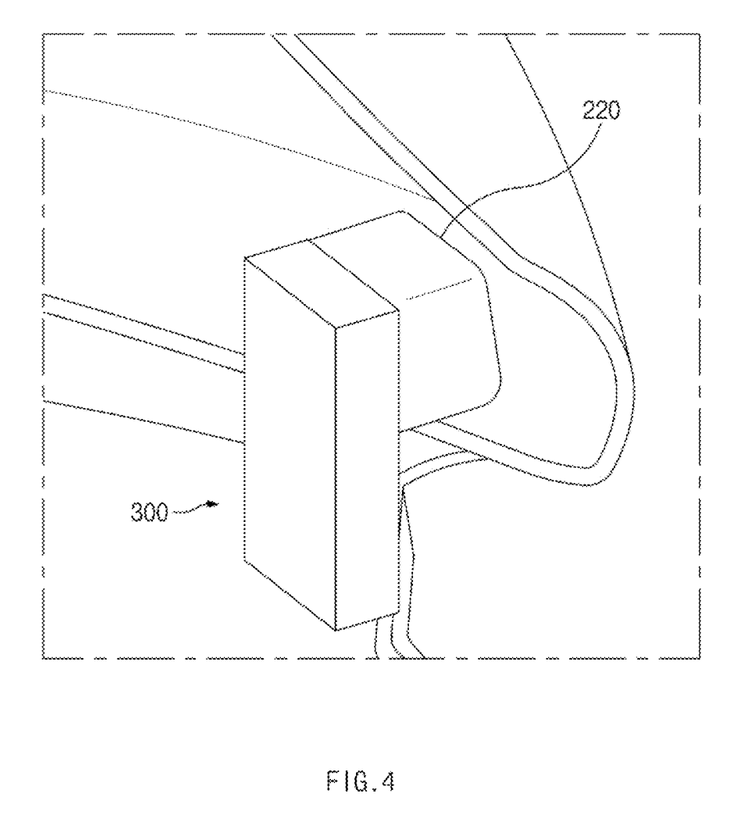
FIG. 4 is an enlarged perspective view illustrating a coupling structure of the assembly of a lamp and a camera for an automobile according to an exemplary embodiment of the present disclosure.

FIG. 1 is a perspective view illustrating an assembly of a lamp and a camera for an automobile according to the present disclosure, and FIG. 2 is a side cross-sectional view schematically illustrating a coupling structure of a lens unit, a camera, and a light blocking member in an assembly of a lamp and a camera for an automobile according to an exemplary embodiment of the present disclosure. Also, FIG. 3 is an exploded perspective view of the assembly of a lamp and a camera for an automobile according to an exemplary embodiment of the present disclosure, and FIG. 4 is an enlarged perspective view illustrating a coupling structure of the assembly of a lamp and a camera for an automobile according to an exemplary embodiment of the present disclosure.

As illustrated in FIG. 1, an assembly 10 of a lamp and a camera for an automobile (hereinafter, referred to as an 'assembly') according to the present disclosure may include a light source 100 that emits light forward. As illustrated in FIG. 1, the light source 100 may be a component that forms a beam pattern on the outside by emitting light forward.

Also, the assembly 10 may further include a lens unit 200 provided in front of the light source 100 and a camera 300 provided on one side of the light source 100 to capture an external image. FIG. 1 illustrates a state in which the camera 300 is provided below the light source 100.

The lens unit 200 may be a component which protects, from the outside, components provided inside the assembly 10, such as the light source 100 and the camera 300 which constitute the assembly 10. Also, the lens unit 200 may be a component which receives light emitted from the light source 100 and forms a light emitting surface of the assembly 10. For example, the lens unit 200 may be an outer lens provided at the outermost portion of the assembly 10. However, unlike the above, the lens unit 200 may be an inner lens provided in an inner space of the assembly 10.

Also, the camera 300 may be provided facing one end area of the lens unit 200 in the left-right direction. FIG. 1 illustrates, as an example, a state in which the camera 300 is provided facing the left end area of the lens unit 200.

Also, as illustrated in FIGS. 2 to 4, the assembly 10 according to the present disclosure may include a light blocking member 400 provided to surround an outer side of a camera lens (not shown) provided in the camera 300. The light blocking member 400 may be a component which prevents at least a portion of the light emitted from the light source 100 from entering the camera lens. More preferably, the light blocking member 400 may be a component which blocks visible light emitted from the light source 100. Thus, the light blocking member 400 may be made of a visible light impermeable material.

Also, according to the present disclosure, the light blocking member 400 may be provided in close contact with the lens unit 200 in order to effectively block the light emitted from the light source 100.

Also, the light blocking member 400 according to the present disclosure may include a material capable of absorbing impact. For example, the light blocking member 400 may include a synthetic rubber material. More preferably, the light blocking member 400 may be made of a synthetic rubber material. When the light blocking member 400 includes the synthetic rubber material or is made of the synthetic rubber material, the impact or vibration applied to the camera 300 due to external force may be absorbed in the light blocking member 400, and thus, it is possible to effectively protect the camera 300 which has a poor resistance to impact and vibration.

Also, according to the present disclosure, the light blocking member 400 may be provided surrounding the entire outer circumference of the camera lens provided in the camera 300. In this case, it is possible to more effectively block the light emitted from the light source 100. Unlike the above, however, the light blocking member 400 may be provided surrounding only a portion of the outer circumference of the camera lens. For example, the light blocking member 400 may be provided surrounding only an area, at which the light emitted from the light source 100 arrives, of the outer circumference of the camera lens.

Also, referring to FIG. 2, the camera 300 may have a view angle in which an external image may be captured through the camera 300. FIG. 2 illustrates a case in which the camera 300 provided in the assembly 10 according to the present disclosure has the total view angle of θ in the upward and downward directions. In this case, the camera 300 may capture images which are present in a space within the view angle.

Here, according to an example of the present disclosure, the light blocking member 400 may be provided in the outside of the space within the view angle of the camera 300. In this case, the light blocking member 400 may be provided outside external images captured by the camera 300. However, according to another example of the present disclosure, at least a portion of the light blocking member 400 may be provided in the space within the view angle of the camera 300. In this case, the portion of the light blocking member 400 may be provided in the external images captured by the camera 300.

Also, as illustrated in FIG. 1, the assembly 10 according to the present disclosure may further include a housing 500 having an inner space in which the light source 100, the camera 300, and the light blocking member 400 are accommodated. The housing 500 may be provided in a region in rear of the lens unit 200. That is, the lens unit 200 may be provided in a region in front of the housing 500.

Also, as illustrated in FIGS. 2 to 4, the lens unit 200 may include a lens body 210 that forms a body of the lens unit 200. Here, according to an exemplary embodiment of the present disclosure, the lens unit 200 may further include a partition wall 220 which is provided on an inner surface of the lens unit 200 and has a shape protruding toward the camera 300. More specifically, the partition wall 220 may be provided on the inner surface of the lens body 210. Here, the light blocking member 400 may be provided in close contact with the partition wall 220.

Similar to the light blocking member 400, the partition wall 220 may also be a component for preventing the light emitted from the light source 100 from entering the camera 300. Also, similar to the light blocking member 400, the partition wall 220 may be provided in the outside of the space within the view angle of the camera 300. In this case, the partition wall 220 may be provided outside the external images captured by the camera 300. However, at least a portion of the partition wall 220 may be provided in the space within the view angle of the camera 300. In this case, the portion of the partition wall 220 may be provided in the external images captured by the camera 300.

Here, the partition wall 220 may have the same material as the lens body 210. Unlike the above, however, the partition wall 220 may be made of a material having visible light transmittance lower than that of the lens body 210 in order to more effectively block the light emitted from the light source 100.

As described above, according to an exemplary embodiment of the present disclosure, the light blocking member 400 may be provided in close contact with the partition wall 220. Thus, the partition wall 220 may be provided at the position, which faces the light blocking member 400, on the inner surface of the lens body 210. Thus, when the light blocking member 400 is provided surrounding the entire outer circumference of the camera lens provided in the camera 300 as described above, the partition wall 220 may also be provided surrounding the entire outer circumference of the camera lens. Unlike the above, however, when the light blocking member 400 is provided surrounding only a portion of the outer circumference of the camera lens, the partition wall 220 may also be provided surrounding only the portion of the outer circumference of the camera lens. For example, the partition wall 220 may be provided surrounding only an area, at which the light emitted from the light source 100 arrives, of the outer circumference of the camera lens.

Also, according to the present disclosure, the partition wall 220 may be provided within the light blocking member 400 when viewed from a region F in front of the lens unit 200 as illustrated in FIG. 2. This may represent that the thickness of the partition wall 220 may be less than the thickness of the light blocking member 400.

Figure 5:
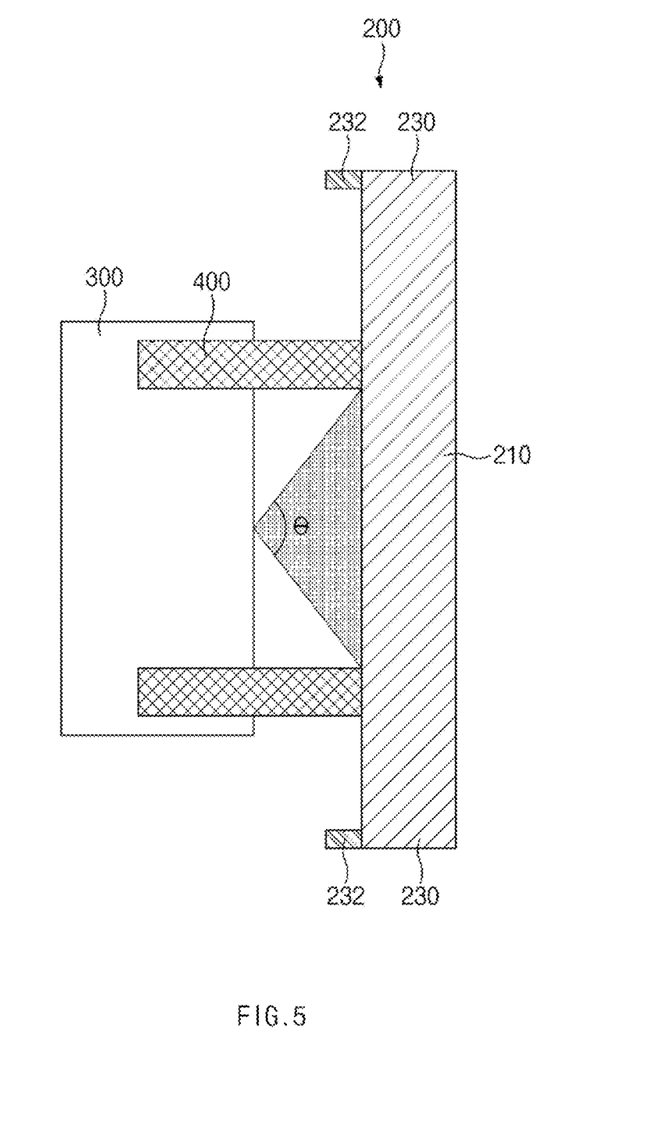
FIG. 5 is a side cross-sectional view schematically illustrating a coupling structure of a lens unit, a camera, and a light blocking member in an assembly of a lamp and a camera for an automobile according to another exemplary embodiment of the present disclosure.
Figure 6:
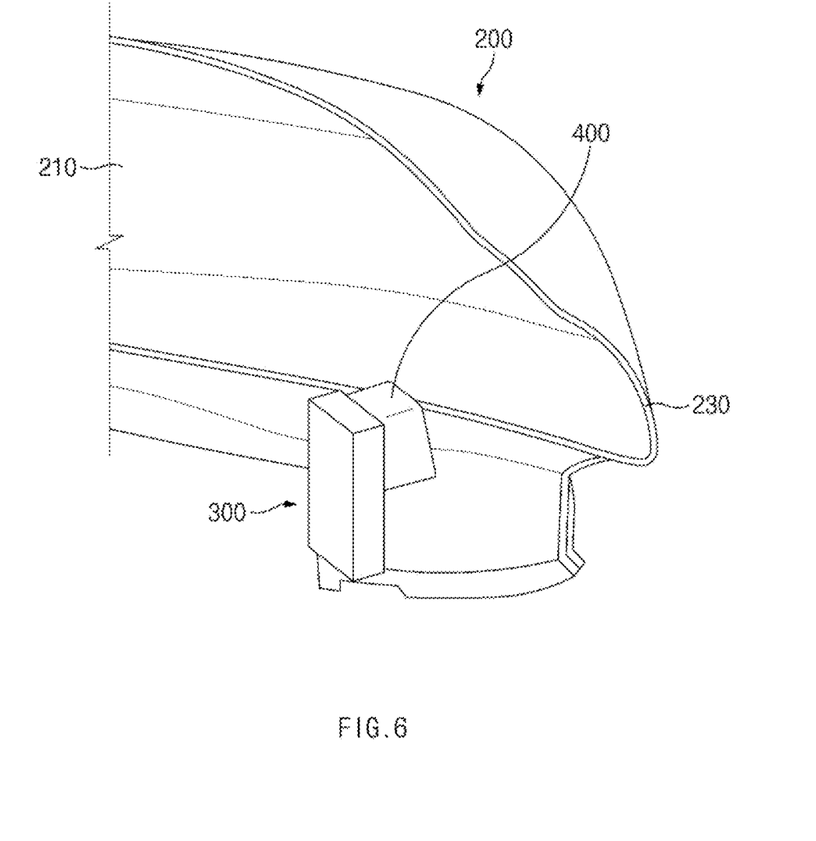
FIG. 6 is an exploded perspective view of the assembly of a lamp and a camera for an automobile according to another exemplary embodiment of the present disclosure.
Figure 7:
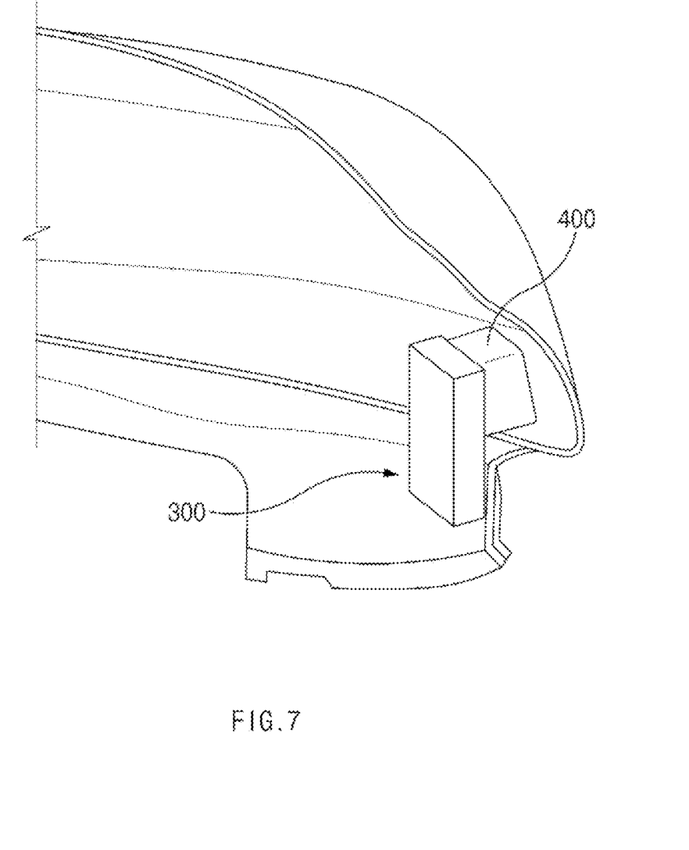
FIG. 7 is an enlarged perspective view illustrating a coupling structure of the assembly of a lamp and a camera for an automobile according to another exemplary embodiment of the present disclosure.

FIG. 5 is a side cross-sectional view schematically illustrating a coupling structure of a lens unit, a camera, and a light blocking member in an assembly of a lamp and a camera for an automobile according to another exemplary embodiment of the present disclosure, and FIG. 6 is an exploded perspective view of the assembly of a lamp and a camera for an automobile according to another exemplary embodiment of the present disclosure. Also, FIG. 7 is an enlarged perspective view illustrating a coupling structure of the assembly of a lamp and a camera for an automobile according to another exemplary embodiment of the present disclosure.

Hereinafter, differences from the structure of the assembly according to an exemplary embodiment of the present disclosure described with reference to FIGS. 2 to 4 will be mainly described. Among the contents described above in relation to the exemplary embodiment of the present disclosure, the contents that are not contradictory to the contents to be described later for another exemplary embodiment of the present disclosure may be applied to another exemplary embodiment of the present disclosure as they are.

According to another exemplary embodiment of the present disclosure, the partition wall 220 may not be provided on the inner surface of the lens body 210. Instead, the light blocking member 400 may extend toward the lens body 210, and the light blocking member 400 may be in close contact with the inner surface of the lens body 210.

Here, the lens unit 200 of the assembly 10 according to the present disclosure may further include an edge 230, which forms the circumferential area of the lens unit 200, in addition to the lens body 210 and the partition wall 220 described above. As illustrated in FIGS. 3, 4, 6, and 7, the edge 230 may be provided along the circumference of the lens body 210.

Here, the edge 230 may be made of a different material from the lens body 210. Also, the edge 230 may be made of the same material as the housing 500. As described later, the lens unit 200 may be coupled to the housing 500 through the edge 230, and when the edge 230 and the housing 500 has the same material, the coupling may be easily established. Unlike the above, however, the edge 230 may be made of the same material as the lens body 210 but made of a different material from the housing 500.

Also, in the assembly 10 according to the present disclosure, hook coupling may be established between the lens unit 200 and the housing 500. More preferably, the hook coupling may be established between the circumferential area of the lens unit 200 and the circumferential area of the housing 500. Among two components, at least one component has a bent section having a bent shape, and interference occurs between the other component and the bent section formed in the one component. Here, the hook coupling may represent coupling established by friction force due to the interference. Hereinafter, the hook coupling formed according to the present disclosure will be described in more detail.

Figure 8:
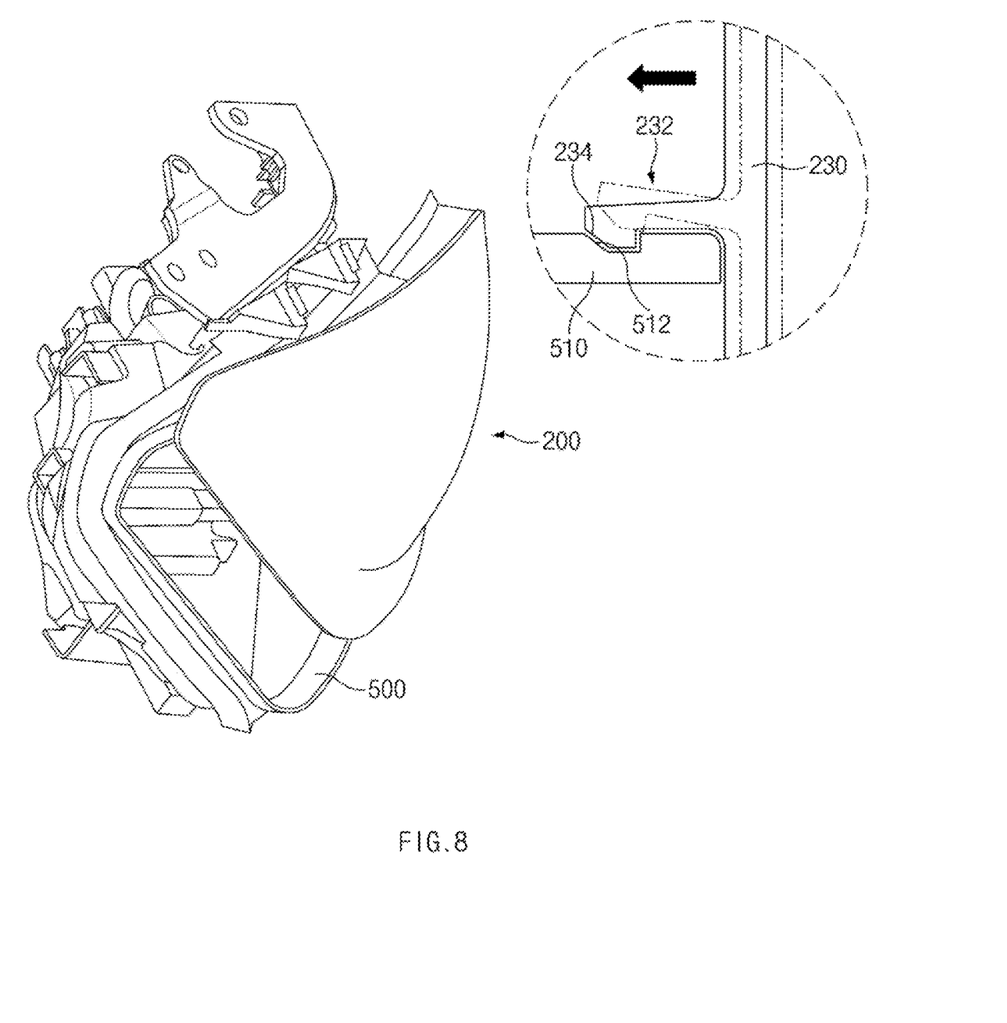
FIG. 8 is a view illustrating a coupling structure between the lens unit and the housing in the assembly of a lamp and a camera for an automobile according to the present disclosure.

FIG. 8 is a view illustrating a coupling structure between the lens unit and the housing in the assembly of a lamp and a camera for an automobile according to the present disclosure.

As illustrated in FIG. 8, a housing protrusion 510 protruding toward the lens unit 200 may be provided in the circumferential area in the front of the housing 500. Also, a lens protrusion 232 protruding toward the housing 500 may be provided in the circumferential area of the lens unit 200. More preferably, the lens protrusion 232 may be provided on the edge 230 of the lens unit 200. Here, the hook coupling described above may be established in a region in which the housing protrusion 510 and the lens protrusion 232 are in direct contact with each other.

Also, as illustrated in FIG. 8, the lens protrusion 232 may be provided surrounding the outer circumference of the housing protrusion 510. Thus, a region, in which the hook coupling is established, of the housing protrusion 510 may be sealed from the outside by the lens protrusion 232.

Also, the edge 230 and the housing protrusion 510 may be made of the same material. More preferably, the lens protrusion 232 and the housing protrusion 510 may be made of the same material. In this case, since the hook coupling may be established in a region where two components having the same material properties are in contact with each other, an assembly process may be performed more easily than a case in which hook coupling is established in a region where two different components are in contact with each other.

Continuing to refer to FIG. 8, a recessed section 512 may be provided in a portion of an outer surface of the housing protrusion 510, and a bent section 234 having a shape bent inward toward the housing protrusion 510 may be provided at an end of the lens protrusion 232. Here, the hook coupling described above may be established in the recessed section 512. More specifically, the hook coupling may be established by inserting the bent section 234 into the recessed section 512. Also, in the assembly 10 according to the present disclosure, the housing protrusion may be provided surrounding the outer circumference of the lens protrusion unlike that illustrated in FIG. 8. In this case, a recessed section may be provided in a portion of the inner surface of the housing protrusion 510, and a bent section having a shape bent outward toward the housing protrusion 510 may be provided at an end of the lens protrusion 232.

According to the present disclosure, in the lamp for an automobile to which the camera is mounted, it is possible to prevent the deterioration in quality of the image captured by the camera due to the light emitted from the light source of the lamp.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. An assembly of a lamp and a camera for an automobile, the assembly comprising:
   a light source configured to emit light forward;
   a camera provided on one side of the light source and configured to capture an external image;
   a lens unit provided in front of the light source and the camera, an inner surface of the lens unit forming a partition wall having a shape protruding toward the camera; and
   a light blocking member provided to surround an outer side of a camera lens provided in the camera in close contact with the partition wall and being configured to block at least a portion of light emitted from the light source,
   wherein the light blocking member is provided in close contact with the lens unit so that a surface of the camera lens is blocked from external environment, and
   wherein the light blocking member is made of rubber material and configured to absorb impact or vibration on the camera,
   wherein, when viewed from a region in front of the lens unit, the partition wall is provided within the light blocking member.

2. The assembly of claim 1, wherein the light blocking member is provided in outside a view angle of the camera.

3. The assembly of claim 1, wherein at least a portion of the light blocking member is provided in a space within a view angle of the camera.

4. The assembly of claim 1, wherein the partition wall is provided in outside a view angle of the camera.

5. The assembly of claim 1, wherein at least a portion of the partition wall is provided in a space within a view angle of the camera.

6. The assembly of claim 1, further comprising a housing having an inner space in which the light source, the camera, and the light blocking member are accommodated,
   wherein the lens unit is provided in a region in front of the housing, and hook coupling is established between a circumferential area of the lens unit and a circumferential area of the housing.

7. The assembly of claim 6, wherein a housing protrusion protruding toward the lens unit is provided in the circumferential area in the front of the housing, and
   a lens protrusion protruding toward the housing is provided in the circumferential area of the lens unit,
   wherein the hook coupling is established in a region in which the housing protrusion and the lens protrusion are in contact with each other.

8. The assembly of claim 7, wherein the lens unit comprises:
   a lens body forming a body of the lens unit; and
   an edge forming the circumferential area of the lens unit,
   wherein the lens protrusion is provided on the edge.

9. The assembly of claim 8, wherein the edge is made of a material different from that of the lens body.

10. The assembly of claim 9, wherein the edge and the housing protrusion are made of the same material.

11. The assembly of claim 7, wherein the lens protrusion is provided surrounding an outer circumference of the housing protrusion.

12. The assembly of claim 11, wherein a recessed section is provided in a portion of an outer surface of the housing protrusion, and
    the hook coupling is established in the recessed section.

13. The assembly of claim 12, wherein a bent section having a shape bent toward the housing protrusion is provided at an end of the lens protrusion, and
    the hook coupling is established by inserting the bent section into the recessed section.

14. The assembly of claim 1, wherein the light blocking member is provided surrounding an entire outer circumference of the camera lens.

15. The assembly of claim 1, wherein the partition wall is provided surrounding an entire outer circumference of the camera lens.

16. The assembly of claim 1, wherein the light blocking member is made of a visible light impermeable material.

17. The assembly of claim 1, wherein the rubber material comprises synthetic rubber material.

18. The assembly of claim 1, wherein the impact or the vibration is caused by an external force.

* * * * *